UNITED STATES PATENT OFFICE.

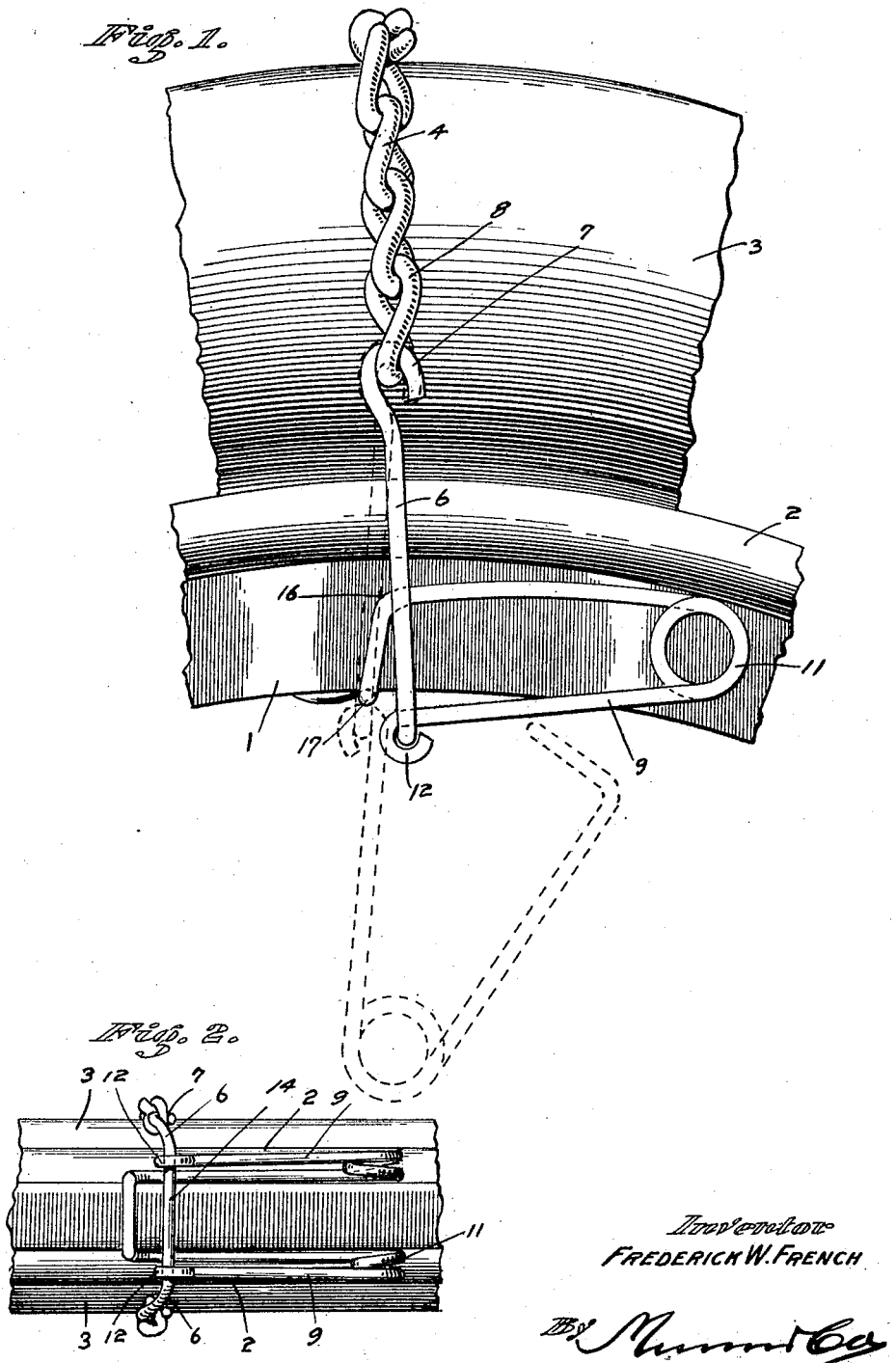

FREDERICK WM. FRENCH, OF FRUITVALE, CALIFORNIA.

ANTISKIDDING DEVICE.

1,412,929.   Specification of Letters Patent.   Patented Apr. 18, 1922.

Application filed October 15, 1921. Serial No. 507,859.

*To all whom it may concern:*

Be it known that I, FREDERICK WM. FRENCH, a citizen of the United States, and a resident of Fruitvale, county of Alameda, and State of California, have invented a new and useful Antiskidding Device, of which the following is a specification.

The present invention refers to improvements in anti-skidding devices and its object is to provide a simple, cheap and durable anti-skidding device for automobile wheels. A further object of the invention is to provide an anti-skidding device that can be readily attached by any one regardless of his skill and under any conditions.

It is well known that the chains now commonly used for automobile wheels are very cumbersome and hard to attach, especially in cases where the automobile is mired down in mud. My device consists of a plurality of units which may be separately attached and can be conveniently secured to any part of the tire so that even if the car is mired down units may be secured to the free portion of the tire. My device also fits firmly on the tire and in the use of my units the side chains are eliminated which are now commonly used and which very often strike against portions of the machine and carry a portion of the mud along with them.

With these objects in view, I have illustrated the preferred form of my invention in the accompanying drawing, in which Figure 1 represents a side elevation of my attachment secured to the tire of an automobile wheel and Figure 2 an inside view looking at it from the axis of the wheel. While this drawing shows the preferred form of my invention, I wish to have it understood that slight changes and deviations may be made without departing from the spirit of my invention or without leaving the scope of the claims attached hereto.

In Figure 1 is shown a portion of an automobile wheel comprising the felloe (1), the rim (2) secured on the same and the tire (3) surrounding the rim. My anti-skidding device comprises a plurality of units, preferably about six or seven for each wheel, one of which units is shown in the drawing. It consists of a chain (4) which is laid around the outer portion of the tire and which is held in its position by the rigid retaining member (6). The latter comprises a rod bent into V shape, to one end of which the chain is permanently fastened while the other end is provided with a hook (7) over which the extreme link (8) of the chain can pass. It will be seen that normally the retaining member (6) and the chain (4) fit very loosely on the tire so that the link (8) may be placed over the hook (7) without any difficulty.

To put the chain and the retaining member (6) under proper tension I provide the spring (9), which may be described as two parallel rods of spring material bent upon themselves so as to form the loops (11). One end (12) of either rod is pivotally secured on the bottom (14) of the retaining member (6) while the two other ends are bent as shown at (16) toward the first mentioned ends and then as shown at (17) toward each other, when they are joined so as to form a guide way to fit on the felloe (1).

The two principal positions of the spring are shown in Figure 1, the dotted lines indicating the position in which the chain is secured to the retaining member, and the full lines showing the final position of the spring. To secure the device on the tire the retaining member is placed loosely around the felloe, the chain swung around the tire and its last link slipped over the hook (7). At this time the spring (9) is in the position shown in dotted lines in Figure 1 and the chain and the retaining member are loosely supported on the frame and the tire. To tighten the chain on the tire the lower end of the spring, that is the end where the latter is turned into a loop, is swung forward so that the guide way formed by the extreme end of the spring engages the felloe and slides along the same underneath the retaining member so as to force the latter away from the felloe and to tighten the chain.

The chain is shown as consisting of twisted links, these being preferred to straight links on account of the fact that they make a better contact with the tire and therefore are less hard on the same.

I claim:

1. An anti-skidding device for a vehicle wheel comprising a rigid member fitting loosely over the felloe of the wheel, a chain passing around the tire adapted to engage said member, and spring means associated with the latter for tightening the grip of the device on the tire, said spring means comprising two parallel spring members bent upon themselves having one end pivotally secured to the rigid member and being adapted to be forced between said member and the felloe.

2. An anti-skidding device for a vehicle wheel comprising a rigid member fitting loosely over the felloe of the wheel, a chain passing around the tire adapted to engage said member, and spring means associated with the latter for tightening the grip of the device on the tire, said spring means comprising two parallel spring members bent upon themselves having one end pivotally secured to the rigid member and the other ends bent and joined so as to form a guide adapted to slide along the felloe into the space between the rigid member and the felloe.

3. An anti-skidding device for a vehicle wheel comprising a chain passing around the tire, a retaining member for holding the same loosely fitting over the felloe, and spring means comprising two parallel spring members bent upon themselves and forming a loop at the bend having one end pivotally secured to the rigid member and being adapted to be forced between said member and the felloe.

FREDERICK WM. FRENCH.